United States Patent
Beckmann et al.

[15] 3,658,636
[45] Apr. 25, 1972

[54] LAMINATED SAFETY GLASS AND LAMINATED BULLET-PROOF GLASS

[72] Inventors: Rolf Beckmann, Siegburg; Johannes Schneider, Troisdorf, both of Germany

[73] Assignee: Dynamit Nobel Aktiengesellschaft, Troisdorf, Germany

[22] Filed: July 1, 1970

[21] Appl. No.: 51,695

Related U.S. Application Data

[63] Continuation-in-part of Ser. No. 709,185, Feb. 29, 1968, abandoned.

[30] Foreign Application Priority Data

Mar. 6, 1968 Germany .......................... D 52 441

[52] U.S. Cl. ............................ 161/199, 161/227, 161/404
[51] Int. Cl. ............................ B32b 17/10, B32b 27/34
[58] Field of Search ................ 161/197, 227, 404, 199; 89/36 A; 260/78 R

[56] References Cited

UNITED STATES PATENTS

| | | | |
|---|---|---|---|
| 2,399,184 | 4/1946 | Heckert | 161/227 X |
| 2,861,021 | 11/1958 | Dietz et al. | 161/404 |
| 2,991,209 | 7/1961 | Worrall | 161/404 |
| 3,009,845 | 11/1961 | Wiser | 161/404 |
| 3,145,195 | 8/1964 | Tsou | 161/197 |
| 3,150,117 | 9/1964 | Gabler | 260/78 |
| 3,447,999 | 6/1969 | Rogier | 161/197 |

*Primary Examiner*—John T. Goolkasian
*Assistant Examiner*—D. J. Fritsch
*Attorney*—Burgess, Dinklage & Sprung

[57] ABSTRACT

Safety or bullet-proof glass composed of at least one layer of silicate glass, amorphous polyamide sheeting and polyvinyl butyral as the adhesive between the polyamide layers and the silicate glass with the silicate glass being at least one of the outside layers. Multiple layers of polyamide and/or silicate glass on each side of the polyvinyl butyral may be used.

6 Claims, No Drawings

LAMINATED SAFETY GLASS AND LAMINATED BULLET-PROOF GLASS

This application is a continuation-in-part of application Ser. No. 709,185 filed Feb. 29, 1968, now abandoned.

It is in the prior art to manufacture safety glass by laminating sheets of silicate glass together with a sheet of plasticized polyvinyl butyral between them. In the use of such laminated safety glasses a minimum strength is required, which is determined by the falling ball test or by the so-called phantom test. Furthermore, the adhesion between the glass and the plastic is supposed to be so great that, even if the glass is severely shattered, very few fragments will fly from it. In laminated glasses, however, their strength on the one hand and their ability to retain fragments on the other are conflicting qualities and depend on the nature of the plastic layer, so that in the extreme case the ability to retain fragments will be poor where the phantom strength is good, and will be good where the phantom strength is poor.

Improved resistance to breakage combined with lower weight is offered by safety glasses made of plastics which have approximately the same good optical properties as silicate glass. However, surface hardness and scratch resistance do not meet the requirements of practical use such as must be met, for example, in motor vehicle manufacture. For this reason attempts have been made to replace the more protected inner sheet of a laminated product with plastic, but this has not yet resulted in an industrially feasible process. One of the reasons is the difference in the thermal expansion coefficients of the two materials. Since plastics expand about 10 times as much as silicate glass as temperature increases, elastic cements are required in order to compensate for the tension produced in actual practice (Zeitschrift Adhasion 9, (Vol. 9), 1965, p. 343). Such a cement is represented by plasticized polyvinyl butyral, which has a good and unvarying optical transparency, and will serve its purpose for a good many years on account of its weather-resistance. However, its adherence to the plastic glasses used hitherto has failed to meet practical requirements. Attempts have therefore been made to improve adherence by adhesives or by chemical surface treatment.

It is therefore an object of this invention to provide a novel bullet-proof or safety glass composite.

Other and additional objects of this invention will become apparent from a consideration of this entire specification including the claims appended hereto.

In accord with and fulfilling these objects, one aspect of this invention includes a laminated safety glass having one or more layers of silicate glass, one or more layers of amorphous polyamide and polyvinyl butyral adhesive. In a preferred embodiment, two layers of silicate glass form the outside of the composite, a layer of polyamide plate is next adjacent inside each outside layer of silicate glass, and a layer of polyvinyl butyral is in the center joining the two polyamide layers together.

The bonding agent may contain plasticizers as is conventional practice and may be used between each of the layers of the composite glass.

The plastic glass layers used according to the invention are amorphous transparent polyamides, for example, polyamides made of terephthalic acid and 2,2,4-trimethylhexamethylenediamine and 2,4,4-trimethylhexamethylenediamine or made of mixtures of the diamine components of U.S. Pat. No. 3,150,117, preferably in the range of viscosity numbers from 92 to 130, polyamides made of alkylester of terephthalic acid (for instance dimethylterephthalate) and 2,2,4-trimethylhexamethylenediamine and 2,4,4-trimethylhexamethylenediamine or mixture of trimethylhexamethylenediamines, preferably in the range of viscosity numbers from 100 to 160 according to Austrian Pat. No. 253,786, polyamides made of hexamethylenediamine and mixtures of terephthalic acid and isophthalic acid or from alkyl and aryl esters thereof in the weight ratio from 60 : 40 to 90 : 10, preferably 70 : 30, this being the ratio of terephthalic acid to isophthalic acid, especially in the range of viscosity numbers from 100 to 160, or transparent polyamides made from mixtures of aliphatic and aromatic acid moieties, for instance adipic acid and terephthalic acid, hexamethylenediamine, p,p'-diaminodicyclohexyl-methane or diaminodicyclohexylpropane and caprolactam, preferably having a viscosity number from 100 to 160; cf. Hopff. Muller and Wenger, "Die Polyamide", 1954, pp. 56 and 142. The general range of viscosity numbers is about 90 to 160.

This viscosity numbers cited are based on DIN 53,727 in an 0.5 percent solution in m-cresol, at a temperature of 25° C.

The polyamides used according to the invention are resistant to shock and dropping, have a high compressive, tear and shear strength, and a high modulus of elasticity, and they have an outstanding adherence to the polyvinyl butyral sheet plus good optical transparency.

Laminated glasses manufactured from these polyamides offer special advantages as armor glasses in an appropriate combination of thicknesses, since resistance to bullets is achieved in a multi-layer sandwich at a lesser total thickness than in the case of a solid plate of the same material. This effect is known with reference to bullet-proof silicate glass, but the special advantage of the bullet-proof plastic glass lies in the fact that, according to the presentday state of the art, a total thickness of 25 to 27 mm is needed in the case of silicate glass, while the same effects are achieved according to the invention at one-fifth to one-third slighter thickness. On this account, and due to the fact that the specific weight of the plastics in only about half as great, an advantageous saving of weight is achieved in many cases, as compared with laminated silicate glass materials.

For the achievement of special bullet-resistance or other effects, filaments or fabrics made, for example, of transparent plastics, especially polyamides, or glass or of metal can be pressed into one or more polyvinyl butyral layers.

Polyamide plates can be bonded to one another or to silicate glass on one or both sides, according to the present invention.

The manufacture of silicate glass-to-plastic laminates or plastic-to-plastic laminates can be performed in a known manner using the present-day equipment of the laminated safety glass industry. For better adhesion it is advantageous to provide the polyvinyl butyral material with a slight moisture content, amounting to from 0.3 to 0.9 percent by weight, and preferably to 0.3 to 0.5 percent by weight. The thickness of the polyvinyl butyral sheets amounts to 0.1 to 1.6 mm, preferably 0.38 to 0.76 mm. The following can be used as softeners or plasticizers for the polyvinyl butyral sheets; dibutyl sebacate, di-(62-butoxyethyl)-adiphate, dioctyphthalate, triethyleneglycol-di-(2-ethylbutyrate), or triethyleneglycol-dipelargonate, in quantities from 15 to 40 percent and preferably 26 to 30 percent by weight.

The total thickness of the laminate can amount to from 2.0 to 10 mm in the case of safety glasses, and 10 to 55 mm in the case of bullet-proof glasses.

The manufacture of the polyamide plates, can be performed, for example, as follows:

a. An amorphous polyamide made of terephthalic acid and 2,2,4-trimethylhexamethylenediamine and having a viscosity number of 116 is poured into a plate mold preheated to 210° C and provided with water cooling, and the press is closed. The uniform warming of the polyamide to the plastification point at 210° C takes 1.5 min. Then, with an increase in pressure to as much as 200 kg/cm$^2$, plates can be pressed into thicknesses of 1 to 8 mm. The period of time under pressure and heat amounts altogether to ½ minute. Then the mold is cooled to 60° C and the pressed plate is removed from it.

b. An amorphous polyamide, consisting of 70 wt-percent isophthalic acid and 30 wt-percent terephthalic acid and hexamethylenediamine and having a viscosity number of 133 was manufactured in the apparatus described in Example a at a temperature of 195° C and a pressure of 300 kg/cm$^2$ into plates 1 to 8 mm thick.

c. An amorphous polyamide made of dimethylterephthalate and the isomer mixture consisting of 2,2,4-trimethylhexamethylenediamine and 2,4,4-trimethylhexamethylenediamine, and having a viscosity number of 144, is manufactured in the apparatus described in Example a at a temperature of 220° C and a pressure of 300 kg/cm² into plates 1 to 8 mm thick.

d. An amorphous polyamide made of adipic acid, hexamethylenediamine, p,p'-diaminodicyclohexylmethane and caprolactam, and having a viscosity number of 132 is manufactured in the apparatus described in Example a at a temperature of 185° C and a pressure of 200 kg/cm² into plates 1 to 8 mm thick.

e. An amorphous polyamide produced from terephthalic acid and the isomer mixture of 2,2,4-trimethyl hexamethylene diamine and 2,4,4-trimethyl hexamethylene diamine having a viscosity number of 94 was extruded to a flat plate (thickness from 0,2 – 10 mm) on a Reifenhauser R 60 screw extruder by means of a decreasing picture screw (compression 1 : 2, thread-depth ratio 9 : 4,5), a three-zone screw (compression 1 : 3, thread-depth ratio (10 : 3,5)) by means of a flat plate mold at the following temperatures (cylinder temperatures in ° C: 220, 250, 290, 295, 280; flat plate mold in 2,60). The speed of rotation of the screw was 13 rpm with a current consumption of 13 amperes.

f. An amorphous polyamide obtained from dimethylterephthalate and an isomeric mixture of 2,2,4-trimethylhexamethylenediamine and 2,4,4-trimethylhexamethylenediamine and having a viscosity value of 160 was extruded in a thickness as mentioned in e on a Reifenhauser R 60 screw extruder by means of a two-zone screw (compression 1 : 2; screw tread-depth ratio 9 : 4,5), tree-zone screw (compression 1 : 3, screw tread-depth ratio 10 : 3,3) or a short-compression screw (compression 1 : 3) at the following temperatures (cylinder temperatures, ° C: 240, 250, 260, 280, 290, mold temperature, ° C 275.) The speed of rotation of the screw was 15 rpm and a current consumption of 13 amperes.

g. The manufacture of massive plates having a thickness of more than 8 mm from the above-mentioned polyamides is achieved by laminating individual plates together at a temperature ranging from 120° to 160° C and at a specific pressure of 160 kg/cm² and a pressing time of 20 to 40 minutes, using a 30 percent solution of the polyamide in dimethylformamide as the adhesive.

The polyvinyl butyral intermediate sheets used in the manufacture of the plastic-glass laminates had a moisture content of 0.3 to 0.5 percent, and the lamination was performed at at temperature of 130° to 135° C, and a press pressure of 10 to 15 kg/cm², the pressing time amounting to from 10 to 30 minutes.

This invention will be illustrated by the following Examples which are in no way limiting on the scope hereof.

Example 1

Sandwiches were made of silicate glass 3 mm thick, plasticized polyvinyl butyral sheet 0.38 mm thick, and pressed plates of the polyamides named under a) and d) 2 mm thick. The laminated glass product, which measured 30 × 30 cm, was subjected to a ball-drop test using a 5-pound steel ball, at a temperature of 20° C, and withstood a drop of more than 5.0 meters. The plastic glass layer was not broken; the adhesion of the polyvinyl butyral sheet to the plastic glass was good, as was the adhesion of the silicate glass splinters. A normal glass laminate of equal thickness was tested for comparison. When a plasticized polyvinyl butyral sheet 0.38 mm thick was used, a drop of only 1.5 mm was achieved, and when a polyvinyl butyral sheet 0.76 mm thick was used, a drop of 4.2 meters was achieved.

Example 2

Sandwiches were made of 3 mm thick silicate glass, 0.76 mm thick plasticized polyvinyl butyral and 2 mm thick pressed plates made of the polyamides named under a) and c). The panes of laminated glass, measuring 36 × 110 cm, were subjected to a drop test using a 10-kilogram "phantom" resembling the head and shoulders of a human being, at a temperature of 20° C, and they withstood a drop of more than 6.5 meters. The plastic glass layer was not broken; the adhesion of the polyvinyl butyral sheet to the plastic glass was good, as was the adhesion of the silicate glass splinters. An ordinary laminated silicate safety glass was tested for comparison. With a plasticized polyvinyl butyral layer 0.76 mm thick and a 3 and a 2 mm thick sheet of silicate glass, the specimen measuring 36 × 110 cm withstood a maximum 10-kg phantom drop of only 4.2 meters.

Example 3

Multiple-layer armor glass panes measuring 20 × 20 cm were prepared from sheets made as described under a) to e) for testing with a 9 mm Parabellum (Luger automatic pistol cartridge) bullet fired from a distance of 3 meters at an angle of impingement of 90°.

The specimens were tightly clamped in a mounting on two opposite sides. Sandwiches or solid plates of the following transparent polyamides were tested:

1. Polyamides made of terephthalic acid and trimethylhexamethylenediamine;
2. Polyamides made of terephthalic acid methyl esters and trimethylhexamethylenediamine;
3. Polyamides made of hexamethylenediamine and mixtures of terephthalic acid and isophthalic acid or from alkyl and aryl esters thereof.

The data given in the table show the results of the shooting test.

TABLE

| Combination of thicknesses of the plastic plates in mm (in order from left to right from shooter) | Total thickness mm | Results of Test |
| --- | --- | --- |
| Solid pane of materials 1, 2 or 3 | 16 | Clean bullet hole |
| Same | 20 | Bullet penetrates to 10–15 mm depth & sticks. Flying splinters. |
| Same | 24 | Bullet penetrates to 10–15 mm depth and sticks. Flying splinters. |
| Same | 32 | Ricochet. Short break in area of impact point. |
| Combination of 1, 2 or 3 4 plus 12 plus 4 | 20.76* | Bullet penetrates 4 mm deep and sticks. Delamination of first layer; no flying splinters. |
| 4 plus 12 plus 4 plus 4 | 25.14* | |

* Polyvinyl butyral sheets as bonding agent in a thickness of 0.38 mm in each case.

Example 4

A four-ply sandwich consisting of a silicate glass sheet 2 mm thick, one 12 mm and one 8 mm thick sheet of a polyamide made of terephthalic acid and trimethylhexamethylenediamine, and finally a second silicate glass sheet 2 mm thick was prepared as a high-quality bullet-proof glass of low weight and high resistance to surface scratching. A polyvinyl butyral sheet 0.76 mm thick was used as the bonding agent. The bullet test was performed as described in Example 3. The bullet was embedded between the two polyamide layers. The outer silicate glass was broken, but the fragments adhered to the polyvinyl butyral sheet.

What is claimed is

1. Composite safety glass article having at least one outside sheet of silicate glass, at least one sheet of an amorphous polyamide and at least one layer of polyvinyl butyral bonding said sheets together; wherein said polyamide layers are each selected from the group consisting of polymers of (A) terephthalic acid or dimethyl terephthalate and at least one diamine selected from the group consisting of 2,2,4-trimethyl hexamethylene diamine and 2,4,4-trimethyl hexamethylene diamine, (B) a mixture of terephthalic and isophthalic acids in a weight ratio of 60 : 40 to 90 : 10 and hexamethylene diamine, and (C) a mixture of adipic and terephthalic acid moities and a mixture of hexamethylene diamine, p,p'-diamine dicyclohexyl methane or diamino dicyclohexyl-propane and caprolactam.

2. Safety glass as claimed in claim 1, wherein said polyamide is a terephthalic acid-trimethyl hexamethylene diamine polyamide having preferably a viscosity number of 92 to 130.

3. Safety glass as claimed in claim 1, wherein said polyamide is a dimethyl terephthalate-trimethyl hexamethylene diamine polyamide having a viscosity number preferably of 100 to 160.

4. Safety glass as claimed in claim 1, wherein said polyamide is a terephthalic acid/isophthalic acidhexamethylene diamine polyamide having a viscosity number preferably of 100 to 160.

5. Safety glass as claimed in claim 1, wherein said polyamide is an adipic acid-hexamethylene diamine-p,p'-diamino dicyclohexylmethane-caprolactam polyamide having a viscosity number of 100 to 160.

6. Safety glass as claimed in claim 1 having two outside silicate glass layers and two inside layers of said amorphous polyamide sheet material.

* * * * *

UNITED STATES PATENT OFFICE
CERTIFICATE OF CORRECTION

Patent No. 3,658,636　　　　　　　　Dated April 25, 1972

Inventor(s) Rolf Beckmann et al

It is certified that error appears in the above-identified patent and that said Letters Patent are hereby corrected as shown below:

Col. 2, line 47

"di (62-butoxyethyl)" should be -- di (ß-butoxyethyl) --.

Col. 1, line 66

"mixture" should be -- mixtures --.

Signed and sealed this 6th day of March 1973.

(SEAL)
Attest:

EDWARD M. FLETCHER, JR.　　　　　ROBERT GOTTSCHALK
Attesting Officer　　　　　　　　　Commissioner of Patents